July 26, 1966

A. ALDROPP 3,262,591

WINCH-TYPE CAMPER COACH LOADER AND UNLOADER

Filed March 27, 1964

Art Aldropp
INVENTOR.

BY

Atty.

July 26, 1966     A. ALDROPP     3,262,591
WINCH-TYPE CAMPER COACH LOADER AND UNLOADER
Filed March 27, 1964     2 Sheets-Sheet 2

Art Aldropp
INVENTOR.

BY Eugene O. Farley

Atty.

United States Patent Office 3,262,591
Patented July 26, 1966

3,262,591
WINCH-TYPE CAMPER COACH LOADER AND UNLOADER
Art Aldropp, Langlois, Oreg.
Filed Mar. 27, 1964, Ser. No. 355,226
7 Claims. (Cl. 214—517)

This application is a continuation-in-part of my application Serial No. 294,525, filed July 12, 1963, for Camper Loader and Unloader, now Patent No. 3,217,914.

This invention pertains to apparatus and method for loading a camper coach body or other heavy object on, and unloading it from, the bed of a truck.

When using the popular camper coach-pickup truck combination, it repeatedly is necessary to load the camper coach on the truck and thereafter to unload it when it is desired to apply the truck to its normal use.

The conventional procedure for accomplishing these functions requires the application of tall jacks by means of which the camper coach is lifted to the necessary elevation. The truck then is backed under the coach and the jacks operated to lower the coach on the truck. This procedure is reversed when the camper coach is unloaded.

The foregoing procedure is cumbersome and, because of the substantial weight of the coach and the height to which it must be elevated by the jacks, attended by the danger of the camper falling. This is a particular hazard if the ground on which the coach stands is uneven. Also, since the jacks must be worked together, it requires at least two people to load and unload the coach.

Accordingly it is the general object of this invention to provide a loader and unloader of simple and inexpensive construction, by means of which camper coaches and other heavy objects may be loaded on trucks and unloaded therefrom.

Other objects of the invention are the provision of a camper coach loader and unloader which is widely applicable to a diversity of coach and truck styles and sizes; installable in the truck without interfering with its normal use; fast in its operation; easily operable by a single operator; free from the hazard of spilling the camper coach on the ground; free from the necessity of backing the truck under a camper coach elevated on jacks; free from danger of accident to the loading and unloading personnel; and easily manufactured and installed on a diversity of truck types at low cost.

The foregoing and other objects of this invention are accomplished by means of apparatus for loading a camper coach body or like object on the aligned and adjacent bed of a truck and broadly comprising pulley means such as a double acting winch, and mounting means for mounting the pulley means on the back of the truck bed.

First and second cables, or other flexible connectors, are arranged on the pulling means with the standing ends secured thereto. They are arranged for selective transmission of a pulling force through one of the cables while contemporaneously paying out the other.

The first cable is secured to the back of the coach body. The second cable is secured to the front of the coach body. Guide means are provided for both the cables and for the coach body, guiding the movement of these components of the assembly during their operation.

Accordingly, the operator standing at a station adjacent the rear of the truck can load the coach body by pulling on the first cable while contemporaneously paying out the second. Thereafter, from the same station, he can unload the coach body by pulling on the second cable while paying out on the first. In this manner the coach body easily, rapidly and safely may be loaded on the truck and thereafter unloaded therefrom.

Considering the foregoing in greater detail and with particular reference to the drawings, wherein:

FIG. 4 is a plan view, partly in section, looking in the direction of the arrows 4—4 of FIG. 1 and illustrating in detail the loading and unloading apparatus;

FIG. 5 is a sectional view taken along line 5—5 of FIG. 4 and illustrating the manner of application of pulling force during the loading of the coach on the truck, the coach and truck being illustrated with the coach in its initial position, ready for loading;

FIG. 6 is a sectional view similar to FIG. 5, but illustrating the coach fully loaded on the truck;

FIG. 7 is a fragmentary detail view in elevation, taken along line 7—7 of FIG. 6 and illustrating further the coach loading mechanism;

FIG. 8 is a detail sectional view, taken along line 8—8 of FIG. 7;

FIG. 9 is a detail sectional view similar to FIG. 8;

FIG. 10 is a fragmentary view in front elevation of the front of the coach, illustrating the manner of attachment of the pulling means thereto; and FIG. 11 is a detail view, partly in section, taken along line 11—11 of FIG. 1 and illustrating the construction of resilient legs employed in conjunction with the coach body to facilitate its loading and unloading.

Figure 1:
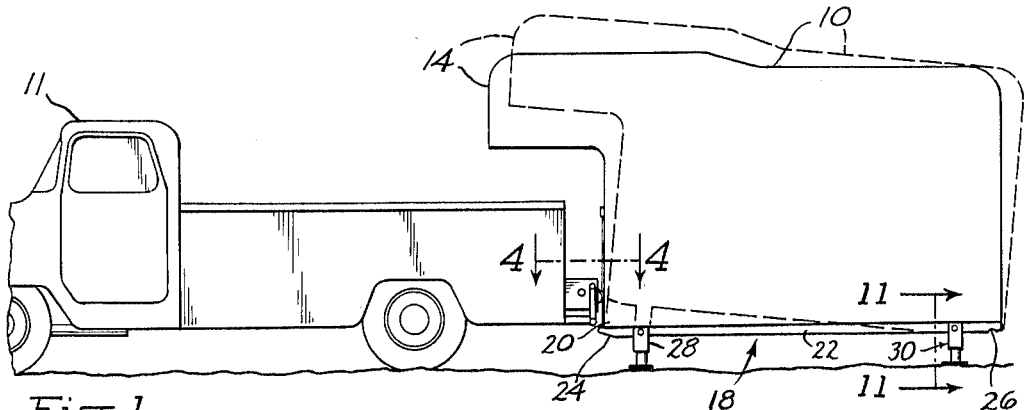
FIGS. 1, 2 and 3 are side elevational views illustrating the sequence of steps followed in loading a camper coach on a pickup truck, using the presently described apparatus.
Figure 2:
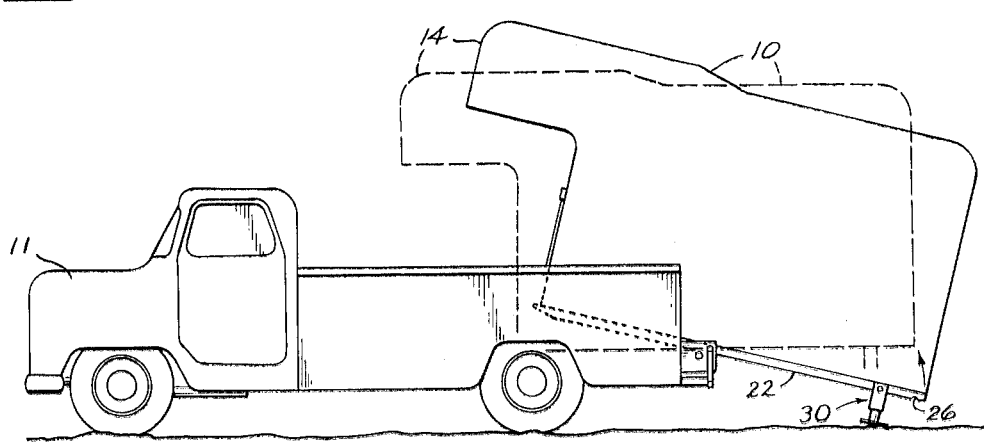
Figure 3:
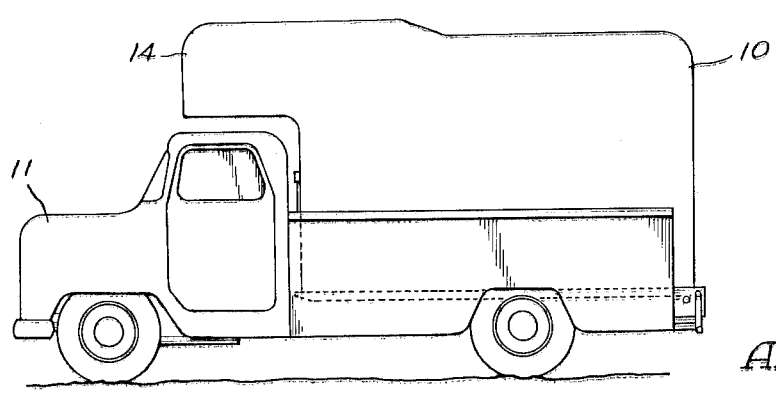

As shown in FIGS. 1, 2 and 3, the apparatus of the invention may be applied to loading a camper-type coach, indicated generally at 10, on a pickup truck, indicated generally at 11. The truck has a bed 12 on the forward end of which are a pair of spaced sockets 13.

The camper is provided with the usual dormitory extension 14 which overlies the cab of the truck. It also is formed with a front panel 16, a bottom panel 18, and a joining front edge 20, FIG. 5.

Bolted to the bottom of the coach body are a pair of longitudinally arranged, spaced, parallel skids 22 which assist in guiding the coach body as it is loaded on and unloaded from the truck. The skids are provided with beveled ends 24 which project forwardly from the plane of front panel 16. The rear ends of the skids are provided with notches 26 which serve a locating function when the coach body is loaded on the truck.

To assist in the loading and unloading operations, the coach body 10 is provided with front legs 28 and rear legs 30, on which the body normally rests in its unloaded condition. The legs are resiliently constructed, as shown in FIG. 11.

Each leg comprises a pair of telescoping tubes 32, 34. The upper end of upper tube 32 carries a U-shaped clamp 36 which embraces skid 22 to which it is affixed by means of a bolt 38.

The lower end of lower tube 34 is formed with a foot 40.

The two tubular leg sections are maintained together in mutually sliding relationship by means of a flexible link member 42, the ends of which are connected one to the upper tube and the other to the lower tube. A compression spring 44 is mounted within the telescoped tubes, one end of the spring bearing on foot 40 and the other on clamp 36. A resilient mounting thus is provided for the coach body which enables it to be unloaded from the truck without shock and which adjusts to unevenness of the ground upon which the demounted coach body may rest.

The loading and unloading mechanism is illustrated in detail in FIGS. 4–9.

The rear angle iron 50 of the truck bed is provided with a pair of spaced, substantial brackets 52. These support a demountable frame 54 which removably seats in brackets 52 and which includes spaced, laterally extending support arms 56, 58, 60 arranged in groups of three, one group on each side of the truck bed. Perforations extend through the outer ends of arms 58, 60.

The support arms mount pulling means which, in the illustrated form of the invention, comprise double acting winch means coupled with cables or like flexible connecting members for exerting a pulling force on selected parts of the coach body, as required, on the one hand, to lift it and pull it on the truck bed, thereby loading it, and, on the other hand, to pull it off the truck bed and lower it, thereby unloading it. To secure a uniform and controlled movement of the coach body as it progresses through the loading and unloading stages, the pulling means is provided in tandem, there being one pulling unit on each side of the truck.

As seen particularly in FIG. 4, there is provided for the operation of both pulling units a shaft 62 journaled in all of support arms 56, 58, 60. The shaft is rotated by a suitable drive which may comprise an electric motor driven by the truck battery, but which, in the illustrated form of the invention, comprises a hand crank 64 connected through a reversing gear reducer 66 to a stub shaft 68. The latter is connected through a pin and clevis connection to a connecting shaft 70. Shaft 70 is connected through a second pin and clevis connection to one end of drive shaft 62. A locking ratchet 72 is fixed to the latter shaft in order to maintain it in any desired position of rotational adjustment.

Also fixed to shaft 62 are a pair of flanged guide rollers 74. These are aligned with skids 22 on the under side of the coach body and guide them up and over the rear end of the truck during the loading and unloading steps.

Keyed to shaft 62 and rotating with it are a pair of double acting winches, i.e. winches 80 made to work in both directions by the inclusion of two cables on each winch, the cables being arranged so that when the winch is turned, one of the cables is pulled in while the other contemporaneously is payed out. This may be accomplished either by reeving the intermediate portion of a single cable about the winch, or by providing two separate cables, wound in opposite directions about the winch.

In the preferred form of the invention, the latter situation prevails, there being provided a winch drum 82 having a spirally grooved periphery. Two cables 84, 86 are wound about the grooves of each drum in opposite directions of winding. Thus, as viewed in FIG. 5, cable 84 is wound on winch 80 by turning the winch drum clockwise, and cable 86 is wound on the winch by turning the winch drum counterclockwise. Both cables track in unison on the grooves of the grooved drum, the one being wound upon the drum while the other is unwound therefrom.

The standing ends of both cables are secured to the winch drum. The running end of cable 84 is secured to front panel 16 of the camper coach body. To insure that slack is not generated in the cable as the coach body is lifted, the point of attachment of the running end of cable 84 should be at least as high as the elevation above the ground of winches 80.

As shown in FIG. 10, the running end of each of cables 84 is passed through guides 88 and is connected to the companion cable by means of a turnbuckle 90. Appropriate adjustment of the latter takes out of the cables any slack which may be present and keeps them uniformly in tension.

The running end of cable 86 is passed beneath the front edge 20 which divides front panel 16 of the coach body from bottom panel 18 thereof. It is attached to the bottom panel at its extreme rear terminal portion. Any suitable attaching means may be employed as, for example, anchor clip 92, FIG. 6, bolted to the underside of the coach body.

Suitable guide means are provided for guiding the cables as they are reeled on winches 80.

To this end there is provided in conjunction with each winch an adjustable roller assembly, indicated generally at 94. Each roller assembly includes a roller 96 journaled in a pair of arms 98, 100. The arms are so arranged that their outer ends support the roller, while their inner ends are journaled on drive shaft 62.

Roller arms 98, 100 serve two important functions in addition to supporting the roller. In the first place, they enable adjustment of the roller between extended, operative positions and lowered, inoperative positions. In the second place, they provide coach locking means for locking the coach in its loaded position, so that it will not inadvertently slide off the truck.

To accomplish these functions, each of arms 98 is journaled on shaft 62 and is provided with roller and coach locking extensions 102, 104, FIG. 8. It also is provided with a locking opening 106.

Roller locking extension 102 extends substantially at right angles to arm 98. It is provided with a locking opening 108.

Coach locking extension 104 extends linearly from arm 98 and is provided with a locking cam 110, the plane of which extends substantially normal to the plane of arm 98.

Also extending substantially at right angles to arm 98 is an angular guide plate 112. This assists in guiding the cable as it pays out from the winch drum.

Support arm 100, FIG. 9, in the outer end of which rollers 96 is journaled, itself is pivotally mounted on shaft 62 so that it can move angularly in unison with support arm 98. Like the latter support arm, it is perforated centrally with a perforation 114. It also is provided with a right angled arm locking extension 116 having a perforation 118.

Locking means are provided for locking each roller assembly 94 selectively in its extended and lowered positions. Such means comprise the elongated locking pin 120. When the roller is in its extended position of FIG. 5, this pin may be inserted through the perforation in support 60 through perforation 118 in extension 116 of support arm 100, through perforation 108 in extension 102 of support arm 98 and through the perforated end of support arm 58.

Upon removal of the locking pin 120, however, roller assembly 94 gravitates to its lowered position of FIGS. 7, 8 and 9. The locking pin thereupon may be inserted through the perforated end of support arm 60, through perforation 114 in arm 100, through perforation 106 in arm 98, and through the perforated end of arm 58, thereby locking the roller assembly in its lowered rest position.

It will be noted particularly that, when the roller assembly is in its lowered position, lineal extension 104 of arm 98 is elevated to the positions of FIGS. 6 and 7. This places cam surface 110 in engagement with a detent 122 fixed to the bottom of the coach body adjacent cable clamp 92. Thus when the roller support arm is in the position of FIGS. 6 and 7, the coach body is locked in its loaded position.

*Operation*

The operation of the herein described camper coach loading and unloading apparatus is as follows:

To load the camper coach on the truck, it is aligned with the bed of the latter, with the forward end of the coach body immediately adjacent the rearward end of the truck, as shown in FIGS. 1 and 5. The demountable winch assembly is fastened in brackets 52 on the truck. Rollers 94 are locked in their extended position by means of pins 120.

Turning winches 80 in a counterclockwise direction by operation of crank 64 accordingly will result in pulling in the running ends of cables 86 while contemporaneously paying out the running ends of cables 84 on each winch drum.

The first result of this action is to lift the forward end of the camper coach to the dotted line position of FIG. 1.

The beveled projecting ends of skids 22 thereupon engage guide rollers 74.

Continued turning of the winch counterclockwise then pulls the body of the coach forwardly or, conversely, pulls the truck itself rearwardly to the intermediate position of FIG. 2.

Further operation of the crank moves the coach body to its fully loaded position of FIG. 3 wherein the extensions 24 of the skids project into sockets 13 mounted on the forward part of the truck bed. This locks the coach body against vertical displacement as it is carried about on the truck.

The coach body is locked from horizontal displacement by removing locking pins 120 and permitting roller assemblies 94 to gravitate to their lowered positions of FIGS. 5 and 7. This throws locking cams 110 on roller support arms 98 into locking engagement with detents 122 on the rear portion of the coach body bottom. After lowering the arms, pins 120 then may be inserted through the appropriate registering perforations in the winch support arms 58, 60 and the roller support arms 98, 100 to lock the roller assemblies in their lowered position.

Unloading the coach body from the truck is accomplished by reversal of the foregoing sequence. The roller assemblies are elevated and winches 80 turned in a clockwise direction. This exerts a pulling force on the running ends of cables 84 while contemporaneously paying out cables 86. Pulling on cables 84 slides the coach body rearwardly off the truck until the intermediate position of FIG. 2 is realized. Any shock which may occur as the coach body touches the ground is absorbed by the resilient leg assemblies 30.

Continued movement of crank 64 in a clockwise direction of rotation moves the coach body and truck relative to each other, usually by advancing the truck. A point is reached at which the front of the coach body passes completely off the rollers and is lowered to the ground. The winch assembly then may be lifted off support clamps 52, permitting normal use of the truck.

It accordingly will be seen that there is provided an apparatus in which the several objects of this invention are achieved and which is well adapted to meet the conditions of practical use.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. In combination with a camper coach or like body and a truck bed, wherein the bottom of the body is below the truck bed when in unloaded position, apparatus for loading and unloading the body onto and from the truck bed, comprising:
   (a) a double acting winch,
   (b) mounting means for mounting the winch on the back of the truck bed,
   (c) first and second cables wound about the winch in opposite directions, thereby arranging the cables for selective transmission of pulling force through one of them, while contemporaneously paying out the other,
   (d) securing means for securing the running end of the first cable to the back of the coach body,
   (e) securing means for securing the running end of the second cable to the front of the coach body,
   (f) and cable guide means arranged for guiding the cables to and from the winch, the cable guide means comprising a roller, a pair of guide roller arms rotatably mounting the roller on the winch means, parallel to the winch means and a spaced distance therefrom, and lock means for releasably locking the roller in an operative position wherein it extends outwardly and rearwardly from the winch means adjacent the front of the coach body, and a rest position wherein it extends downwardly substantially beneath the winch means.

2. The combination of claim 1 including detent means on the guide roller arms, the detent means being positioned for engagement with the coach body when the coach body is loaded on the truck bed and the guide roller is in its rest position.

3. In combination with a camper coach or like body and a truck bed, wherein the bottom of the body is below the truck bed when in unloaded position, apparatus for loading and unloading the body onto and from the truck bed, comprising
   (a) reversely movable pulling means mounted on the back end of the truck bed,
   (b) first and second flexible connecting means having their standing ends engaging the pulling means and arranged for selective transmission of a pulling force through one of the connecting means while contemporaneously paying out the other connecting means,
   (c) first securing means on the back end of the coach body for securing the running end of the first connecting means thereto, with the first connecting means extending forwardly along the bottom of the body,
   (d) second securing means on the front end of the body for securing the running end of the second connecting means thereto,
   (e) the pulling means being operable in one direction of movement to pull on the first connecting means to load the body onto the truck bed, and operable in the opposite direction of movement to pull on the second connecting means to unload the body from the truck bed,
   (f) guide means for the first and second flexible connecting means and comprising a roller, a pair of guide roller arms rotatably mounting the roller on the back end of the truck bed transversely thereof and a spaced distance outwardly therefrom, and
   (g) lock means for releasably locking the roller in an operative position wherein it extends outwardly and rearwardly from the pulling means and a rest position wherein it extends downwardly substantially beneath the pulling means.

4. The combination of claim 3 including guide means for the first and second flexible connecting means and comprising a roller, a pair of guide roller arms rotatably mounting the roller on the back end of the truck bed transversely thereof and a spaced distance outwardly therefrom, and lock means for releasably locking the roller in an operative position wherein it extends outwardly and rearwardly from the pulling means and a rest position wherein it extends downwardly substantially beneath the pulling means.

5. The combination of claim 3 including detent means on the guide roller arms, the detent means being positioned for engagement with the body when the latter is loaded onto the truck bed and the guide roller is in its rest position.

6. Apparatus for loading and unloading a camper coach or like body onto and from a truck bed, wherein the bottom of the body is below the truck bed when in unloaded position, the apparatus comprising:
   (a) reversely movable pulling means,
   (b) bracket means mounting the pulling means and adapted for releasable attachment to the rear end of a truck bed,
   (c) first and second flexible connecting means having their standing ends engaging the pulling means and arranged for selective transmission of a pulling force through one of the connecting means while contemporaneously paying out the other connecting means,
   (d) first securing means adapted for releasable attachment to the back end of a coach body for securing the running end of the first connecting means thereto, with the first connecting means extending forwardly along the bottom of the body, (e) second securing means adapted for releasable attachment to the front end of the coach body for securing the runing end of the second connecting means thereto, (f) the pulling means being operable in one direction of movement to pull on the first connecting means to load the body onto the truck bed, and operable in the opposite direction of movement to pull on the second connecting means to unload the body from the truck bed, (g) guide means for the first and the second flexible connecting means mounted movably on the bracket means for positioning transversely of and a spaced distance outwardly from the rear end of the truck bed, and (h) lock means for releasably locking the guide means in an operative position wherein it extends outwardly and rearwardly from the pulling means and a rest position wherein it extends downwardly substantially beneath the pulling means.

7. Apparatus for loading and unloading a camper coach or like body onto and from a truck bed, wherein the bottom of the body is below the truck bed when in unloaded position, the apparatus comprising:

(a) a double acting winch, (b) bracket means mounting the winch and adapted for releasable attachment to the rear end of a truck bed, (c) first and second cables wound about the winch in opposite directions, thereby arranging the cables for selective transmission of pulling force through one of them while contemporaneously paying out the other, (d) securing means adapted for releasable attachment to the back end of a coach body for securing the running end of the first cable to the back of the coach body, (e) securing means adapted for releasable attachment to the front end of the coach body for securing the running end of the second cable to the front of the coach body, (f) cable guide means mounted movably on the bracket means for positioning parallel to the winch and a spaced distance therefrom outwardly from the rear end of the truck bed, and (g) lock means for releasably locking the guide means in an operative position wherein it extends outwardly and rearwardly from the winch adjacent the front end of a coach body and a rest position wherein it extends downwardly substantially beneath the winch.

References Cited by the Examiner

UNITED STATES PATENTS

| | | | |
|---|---|---|---|
| 1,521,156 | 12/1924 | Jenkins | 214—38.8 X |
| 2,021,952 | 11/1935 | Wren | 214—517 |
| 2,580,501 | 1/1952 | Anderson et al. | 214—517 |
| 2,909,295 | 10/1959 | Weir | 214—82 |
| 2,958,432 | 11/1960 | Milhem | 214—84 |
| 3,197,054 | 7/1965 | Settem | 214—85.1 X |

GERALD M. FORLENZA, *Primary Examiner.*

A. J. MAKAY, *Assistant Examiner.*